(12) United States Patent
Grabarnik et al.

(10) Patent No.: US 8,181,230 B2
(45) Date of Patent: May 15, 2012

(54) SYSTEM AND METHOD FOR ADAPTIVE APPROXIMATING OF A USER FOR ROLE AUTHORIZATION IN A HIERARCHICAL INTER-ORGANIZATIONAL MODEL

(75) Inventors: Genady Grabarnik, Scarsdale, NY (US); Larisa Shwartz, Scarsdale, NY (US); Maheswaran Surendra, Croton-on-Hudson, NY (US)

(73) Assignee: International Business Machines Corporation, Armonk, NY (US)

( * ) Notice: Subject to any disclaimer, the term of this patent is extended or adjusted under 35 U.S.C. 154(b) by 989 days.

(21) Appl. No.: 12/164,949

(22) Filed: Jun. 30, 2008

(65) Prior Publication Data

US 2009/0328157 A1     Dec. 31, 2009

(51) Int. Cl.
*G06F 7/04* (2006.01)
(52) U.S. Cl. .......................................... 726/4
(58) Field of Classification Search ............... 726/4, 26, 726/27–30, 1, 17, 21; 707/720, 781, 783, 707/786
See application file for complete search history.

(56) References Cited

U.S. PATENT DOCUMENTS

| | | | |
|---|---|---|---|
| 5,421,011 A | 5/1995 | Camillone et al. | |
| 6,105,063 A | 8/2000 | Hayes et al. | |
| 7,085,834 B2 | 8/2006 | Delany et al. | |
| 7,231,657 B2 | 6/2007 | Honarvar et al. | |
| 7,231,661 B1 | 6/2007 | Villavicencio et al. | |
| 7,587,755 B2* | 9/2009 | Kramer | 726/4 |
| 7,712,127 B1* | 5/2010 | Thompson et al. | 726/4 |
| 2003/0229623 A1* | 12/2003 | Chang et al. | 707/3 |
| 2004/0193880 A1 | 9/2004 | Walmsley | |
| 2005/0288939 A1* | 12/2005 | Peled et al. | 705/1 |
| 2006/0026667 A1 | 2/2006 | Bhide et al. | |
| 2007/0056026 A1* | 3/2007 | Britton et al. | 726/5 |
| 2007/0150934 A1* | 6/2007 | Fiszman et al. | 726/1 |
| 2007/0283443 A1* | 12/2007 | McPherson et al. | 726/26 |
| 2008/0016580 A1* | 1/2008 | Dixit et al. | 726/27 |
| 2008/0072316 A1* | 3/2008 | Chang et al. | 726/21 |
| 2008/0222719 A1* | 9/2008 | Chang et al. | 726/17 |
| 2009/0019516 A1* | 1/2009 | Hammoutene et al. | 726/1 |
| 2009/0300544 A1* | 12/2009 | Psenka et al. | 715/810 |

* cited by examiner

*Primary Examiner* — Beemnet Dada

(74) *Attorney, Agent, or Firm* — Tutunjian & Bitetto, P.C.; Louis J. Percello, Esq.

(57) ABSTRACT

A system and method are provided for adaptive approximating of a user for role authorization in a hierarchical inter-organization model. The system includes an authorization redirector for receiving a request for an access control decision for a user. The system further includes an adaptive authorizer for dynamically determining, at run-time, a user role approximation for the user responsive to the request. The user role approximation is based on at least one of a system state and a system goal corresponding to a hierarchical inter-organizational model.

18 Claims, 6 Drawing Sheets

600

| C | R | U | D | E |
|---|---|---|---|---|
| R | R | R | R | R |
| E | E | D | U |   |
|   |   | E | E |   |
|   |   | C |   |   |

FIG. 6

SYSTEM AND METHOD FOR ADAPTIVE APPROXIMATING OF A USER FOR ROLE AUTHORIZATION IN A HIERARCHICAL INTER-ORGANIZATIONAL MODEL

BACKGROUND

1. Technical Field

The present invention relates to inter-organizational models and, more particularly, to a system and method for adaptive approximating of a user for role authorization in a hierarchical inter-organizational model.

2. Description of the Related Art

To gain a competitive advantage, information technology (IT) service providers look to utilize a single information technology service management solution for multiple consumers (customers). Security (e.g., Authorization/Authentication) and privacy issues play a critical role in the cost-effective standardization of service offerings based on a multi-consumer solution. In the service management of large scale information systems, the information that is managed is very granular. For example the INTERNATIONAL BUSINESS MACHINES configuration management database (CMDB) has approximately 1000 different types of configuration items. Often technological and governmental standards require that supporting tasks could be restricted to a particular user.

SUMMARY

The shortcomings of the prior art are overcome and additional advantages are provided through the provision of a system and method for adaptive approximating of a user for role authorization in a hierarchical inter-organizational model.

According to an aspect of the present principles, there is provided a system. The system includes an authorization redirector for receiving a request for an access control decision for a user. The system further includes an adaptive authorizer for dynamically determining, at run-time, a user role approximation for the user responsive to the request. The user role approximation is based on at least one of a system state and a system goal corresponding to a hierarchical inter-organizational model.

According to another aspect of the present principles, there is provided a method. The method includes receiving a request for an access control decision for a user. The method further includes dynamically determining, at run-time, a user role approximation for the user responsive to the request. The user role approximation is based on at least one of a system state and a system goal corresponding to a hierarchical inter-organizational model.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein:

FIG. 6 is a block diagram showing exemplary permission approximation 600, in accordance with an embodiment of the present principles.

DETAILED DESCRIPTION OF PREFERRED EMBODIMENTS

Figure 1:
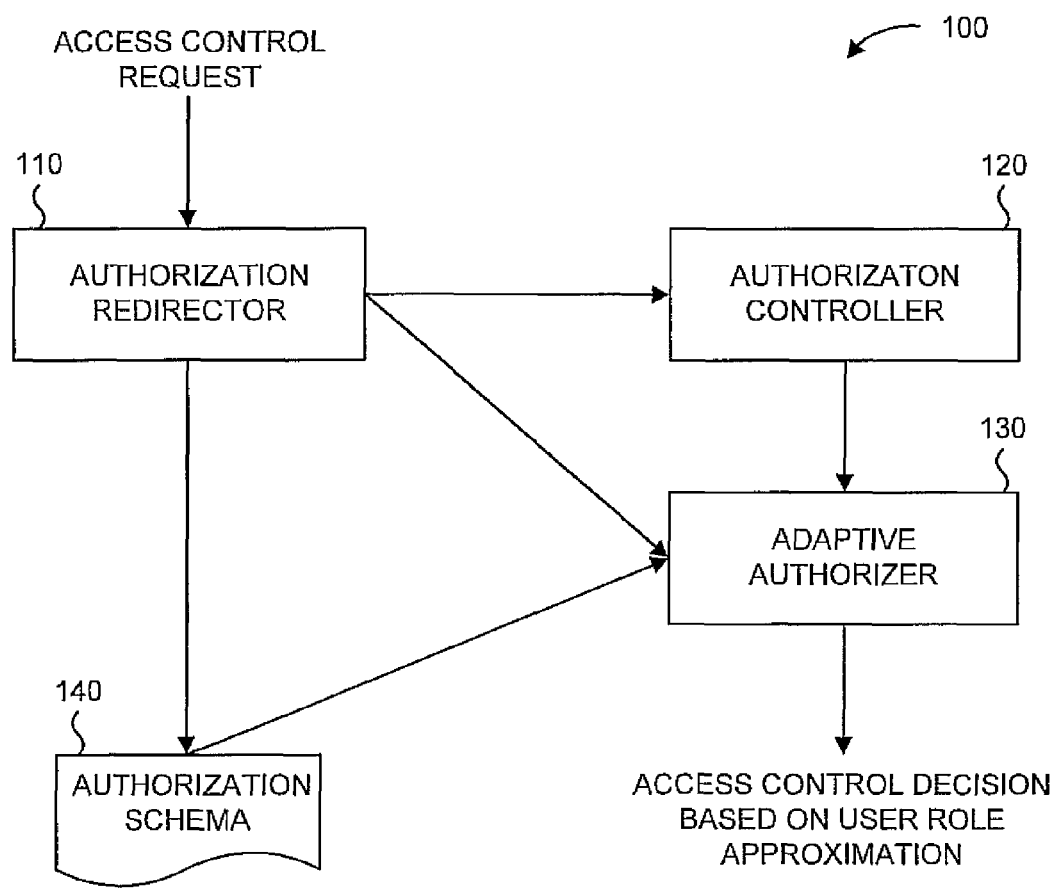
FIG. 1 is a block diagram showing an exemplary system 100 for adaptive approximating of a user for role authorization in a hierarchical inter-organizational model, in accordance with an embodiment of the present principles.

Referring now in detail to the FIGURES in which like numerals represent the same or similar elements and initially to FIG. 1, an exemplary system 100 in accordance with an embodiment of the present principles is shown for adaptive approximating of a user for role authorization in a hierarchical inter-organizational model.

In an embodiment, the system 100 includes an authorization redirector 110, an authorization controller 120, an adaptive authorizer 130, and an authorization schema 140.

A first output of the authorization redirector 110 is connected in signal communication with an input of an authorization controller 120. A second output of the authorization redirector 110 is connected in signal communication with a second input of the adaptive authorizer 130. A third output of the authorization redirector 110 is connected in signal communication with an input of an authorization schema 140.

An output of the authorization controller 120 is connected in signal communication with a first input of the adaptive authorizer 130. An output of the authorization schema 140 is connected in signal communication with the second input of the adaptive authorizer 130.

An input to the authorization redirector 110 is available as an input to the system 100, for receiving run-time requests to authorization when system is configured to allow adaptive authorization. The input of the authorization controller 120 receives, from the authorization redirector 110, requests for authorization in systems whose configurations do not allow adaptive authorization so as to provide authorization in accordance with predefined policy. An output of the adaptive authorizer 130 is available as an output to the system 100, for outputting inferred access control decisions for one or more users.

Authorization redirector 110 is responsible for analyzing a runtime environment and making a decision for each request to allow adaptation of authorization policy (as per the adaptive authorizer 130) or to use predetermined policy (as per the authorization schema 140). In some cases the request involves multiple objects that require different authorization. In this case, the output of authorization redirector 110 will be processed partially by adaptive authorizer 130 and partially by authorization schema 140. The input to adaptive authorizer 130 is an authorization policy (for example, such as one obtained after adaptive techniques were applied to an initial policy or the authorization policy may be the initial policy itself that is used without adaptation).

Figure 2:
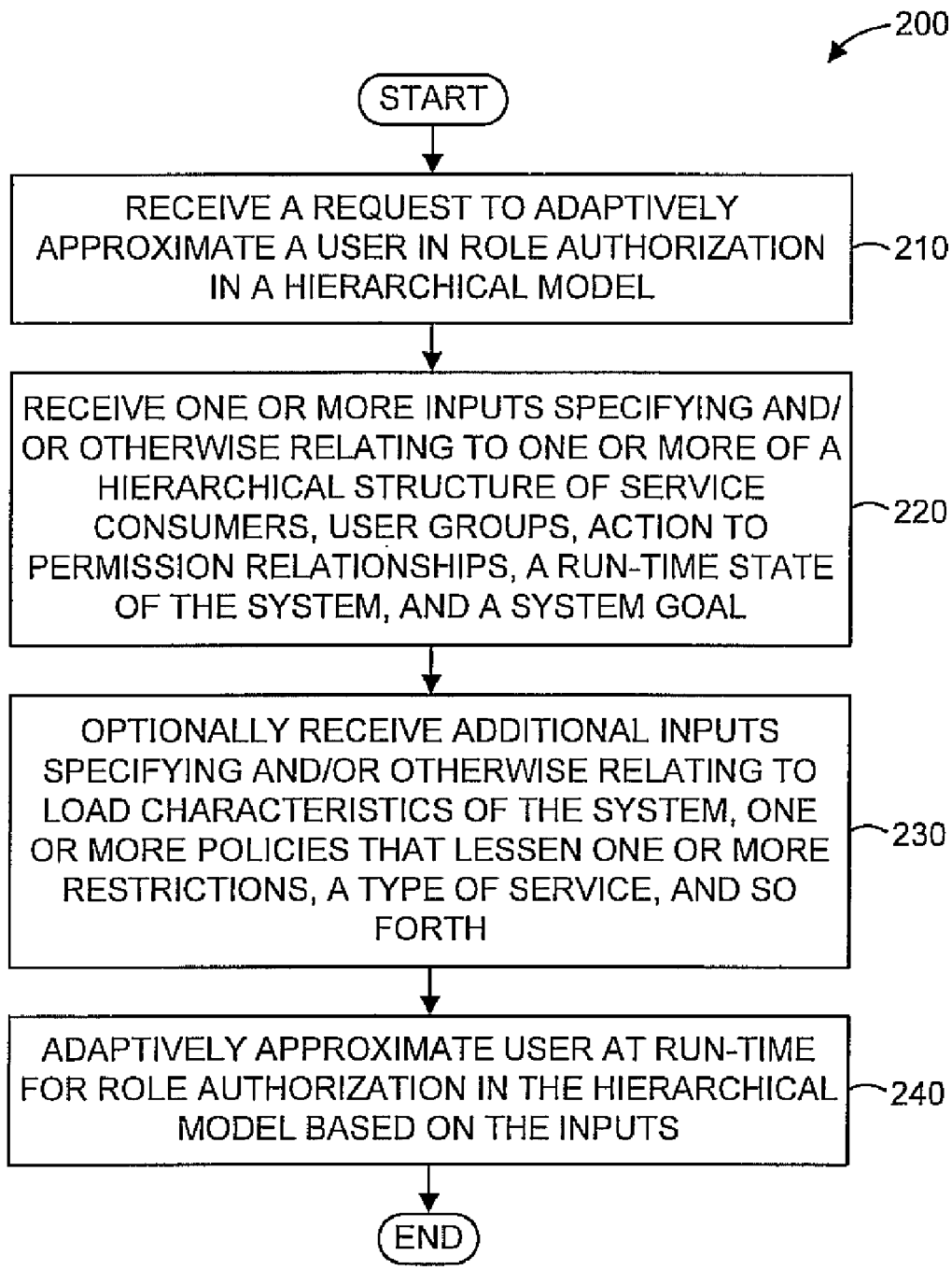
FIG. 2 is a flow diagram showing an exemplary method 200 for adaptive approximating of a user for role authorization in a hierarchical inter-organizational model, in accordance with an embodiment of the present principles.

Referring now to FIG. 2, an exemplary method 200 is shown for adaptive approximating of a user for role authorization in a hierarchical model, in accordance with an embodiment of the present principles.

The method 200 includes receiving a request to adaptively approximate a user in role authorization in a hierarchical model (step 210). In an embodiment, such request may simply be provided as a request for authorization for the user. In such a case, the adaptive approximating of the user may be performed automatically. In another embodiment, an indicator is provided to indicate that this particular authorization is to be an adaptive approximation for example, versus a standard non-approximation based approach to authorizing the user.

In support of the request, one or more inputs are received specifying and/or otherwise relating to one or more of a hierarchical structure of service consumers, user groups, action to permission relationships, a run-time state of the system, and a system goal (step 220). It is to be appreciated that such inputs may involve, for example, actions and corresponding permissions, an inference depth (relating, but not limited to, for example, a specified organizational level, a specified organizational structure, and/or one or more levels in the hierarchical structure), a service management artifact (SMA) authorization depth (relating, but not limited to, for example, one or more high levels, one or more intermediate levels, one or more low levels, one or more high level elements, one or more intermediate level elements, and one or more low level elements, with respect to a corresponding SMA tree), relationship policies (with respect to, but not limited to, for example, authorization to related SMAs).

Optionally, in further support of the request, one or more additional inputs are received specifying and/or otherwise relating to load (and/or other operating) characteristics of the system, one or more policies that lessen (e.g., relax) one or more restrictions imposed by the inferred control decision, a type of service (for example, available for use, currently being used, currently requested, and so forth), and so forth (step 230).

The user is adaptively approximated at run-time for role authorization in the hierarchical inter-organizational model based on the inputs (step 240). In an embodiment, the adaptive approximation of the user for role authorization is performed in place of an enforced non-approximated authorization.

It should be understood that the elements shown in the FIGURES may be implemented in various forms of hardware, software or combinations thereof. Preferably, these elements are implemented in software on one or more appropriately programmed general-purpose digital computers having a processor and memory and input/output interfaces.

Embodiments of the present invention can take the form of an entirely hardware embodiment, an entirely software embodiment or an embodiment including both hardware and software elements. In a preferred embodiment, the present invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that may include, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

In one or more embodiments of the present principles, a method is provided that allows, under predefined conditions, the use of an approximating authorization in place of enforced (standard) authorization schemas.

For example, in one embodiment, the combination of a user-in-role authorization model with group authorization to consuming organizations allows for the dynamic approximation of user-authorization control to group authorization control under predefined conditions.

Moreover, another embodiment, based on the organizational hierarchy of subject, object, action (role) and user-defined parameters, allows us to infer access control decisions to facilitate performance.

Further, another embodiment allows us to adapt access control within predefined limits based on a system state. Such system state may involve, but is not limited to, a process type, CPU utilization, and so forth.

The present principles are directed to the problem of, for example, extended user based role based access control (REAC) authorization.

Figure 3:
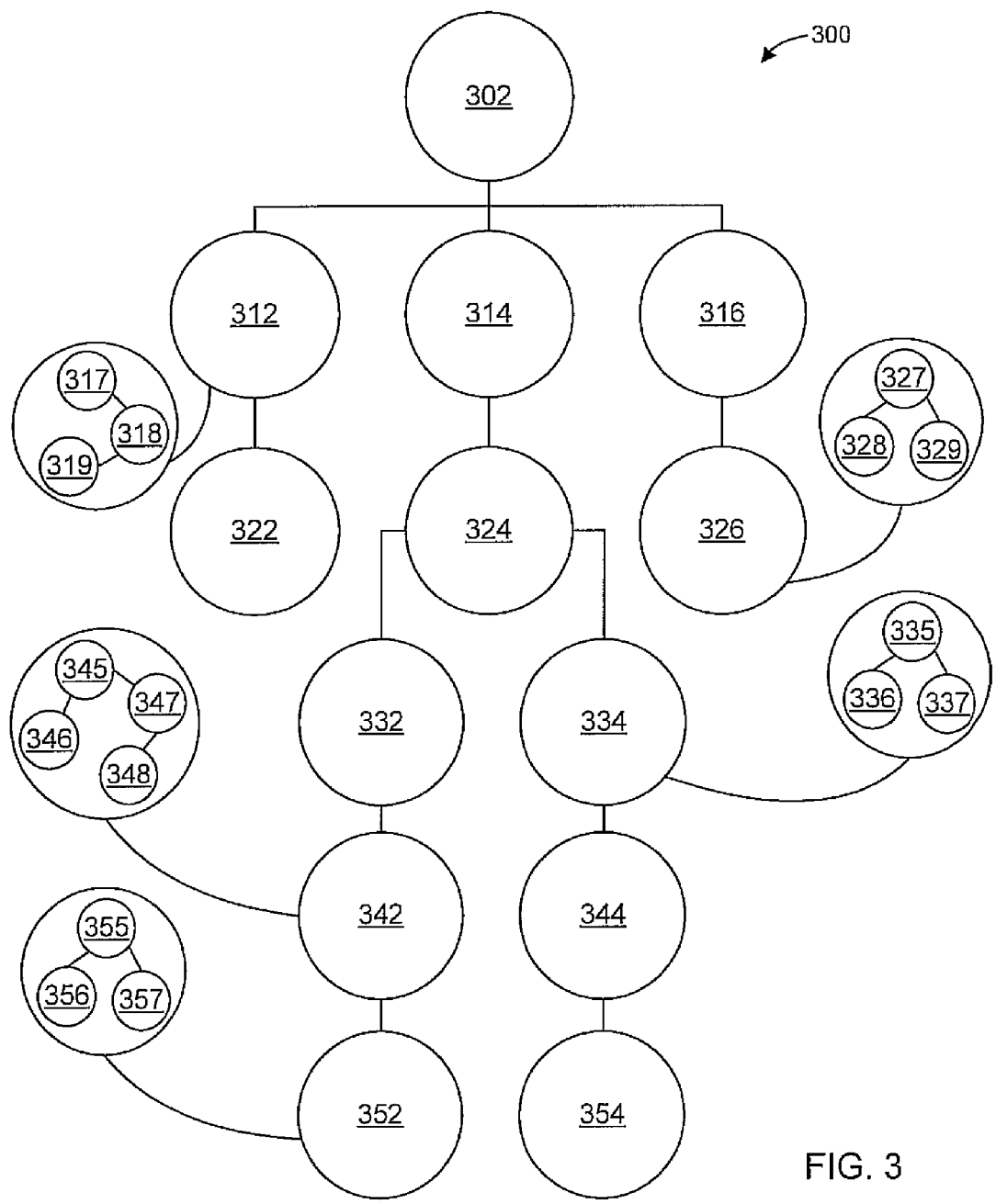
FIG. 3 is an example of hierarchical structure 300 of a subject, in accordance with an embodiment of the present principles.

Referring to FIG. 3, an exemplary hierarchical structure 300 of a subject in accordance with an embodiment of the present principles is shown.

The hierarchical structure 300 includes as a top node a business process node (order management) 302. A next level immediately below the business process node (order management) 302 includes a business process node (order entry) 312, a business process node (credit check) 314, and a business process node (billing) 316, with each of the business processing nodes 312, 314, and 316 being connected to the business process node (order management) 302.

A next level immediately below the business process nodes 312, 314, and 316 includes an application node 322, an application node 324, and an application node 326, with each of the business nodes 312, 314, and 316 being respectively connected to one of the application nodes 322, 324, and 326.

A next level immediately below the application nodes 322, 324, and 326 includes an infrastructure application node 332 and an infrastructure application node 334, with the application node 324 being connected to each of the infrastructure application nodes 332 and 334.

A next level immediately below the infrastructure application nodes 332 and 334 includes a server node 342 and a server node 344, with each of the infrastructure nodes 332 and 334 being respectively connected to one of the server nodes 342 and 344.

A next level immediately below the server nodes 342 and 344 includes a hardware node 352 and a hardware node 354, with each of the server nodes 342 and 344 being respectively connected to one of the hardware nodes 352 and 354.

As shown in further detail, each of the business process nodes 312, 314, and 316 under the top node 302 includes a business process sub-node 317 connected to an activity sub-node 318 which, in turn, is connected to a software resource sub-node 319.

Each of the application nodes 322, 324, and 326 includes a composite application sub-node 327 connected to both an AppDefinition (application definition) sub-node 328 and an AppDescriptors (application descriptors) sub-node 329.

Each of the infrastructure application nodes 332 and 334 include a WebSphere server sub-node 335 connected to both a WebSphereJ2EEApplication sub-node 336 and a WebSphereWebModule sub-node 337.

Each of the server nodes 342 and 344 includes a computer system sub-node 345 connected to both a file system sub-node 346 and an operating system sub-node 347. The operating system sub-node 317 is connected to a software installation sub-node 348.

Each of the hardware nodes 352 and 354 includes a composite physical package sub-node 355 connected to both a physical component sub-node 356 and a physical connector sub-node 357.

In the hierarchical structure 300, at configuration time, additional restrictions could be imposed on service management artifacts (SMAs) that are used for services provided on each of the organizational levels (for example, only the SMA that is associated with Dept A could be associated with Unit A). Service management artifacts could be associated with a number of organizations in the hierarchical structure. The providing of references/back-pointers for each service management artifact is expensive and restricts the flexibility of the model. However, the service management processes require extensive filtering/ordering based on each level of the organizational hierarchy (for example, based on the well-known variability of the change process by customer, account, and so forth, and/or based on requirements to search service management artifacts by a consuming organization, and so forth). User based authorization is too rigid for some processes/resource types/tasks (for example, the problem-incident management/ticket/problem resolution).

Moreover, the present principles are directed to the problem of, for example, group based authorization.

Standardization of configuration management, security and privacy issues and high labor specialization often require authorization on a very granular level.

In an embodiment, an access control decision is inferred for a user based on the organizational hierarchy of subject, objection, action, and/or user-defined parameters. Examples of subject approximation, object approximation, and permission approximation are described with respect to FIGS. 4, 5, and 6, respectively. For further illustration, possible exemplary subjects include, but are not limited to, any hierarchical organization and/or portion thereof, depending on the level of granularity. Thus, for example, the subject may be, but is not limited to, a person, team, group, department, division, organization, and so forth. Moreover, possible exemplary objects include, but are not limited to, servers which are assigned to different organizations, and so forth. Further, possible exemplary permissions include, but are not limited to update, read, write, and so forth.

Figure 4:
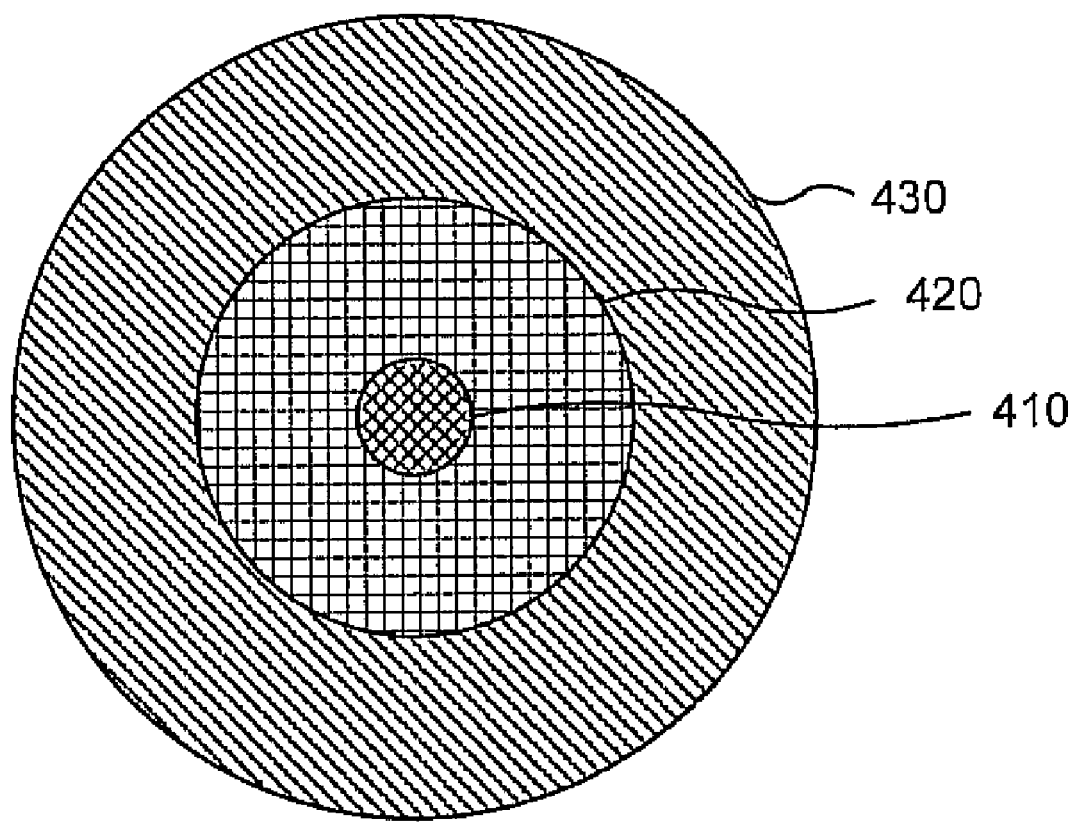
FIG. 4 is a block diagram showing exemplary subject approximation 400, in accordance with an embodiment of the present principles.

Referring to FIG. 4, exemplary subject approximation 400 is shown in accordance with an embodiment of the present principles. The subject approximation 400 is shown with respect to an embedded group 410 with respect to a higher level group 420. The high level group 420, in turn, is embedded in a highest group 430.

In the case of embedded groups, user's rights could be approximated to the closest group's rights or to any other (higher level) group.

Figure 5:
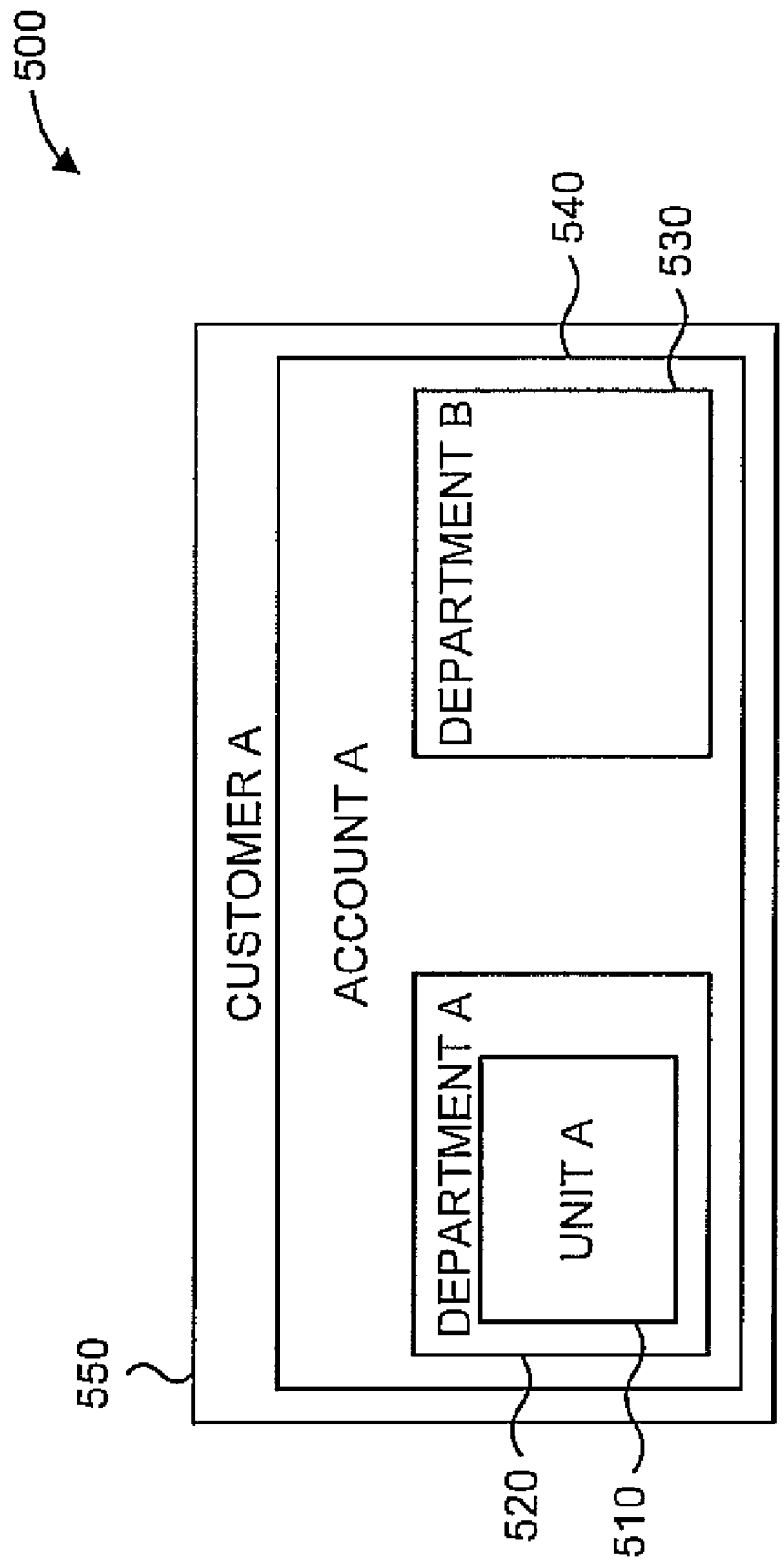
FIG. 5 is a block diagram showing an exemplary hierarchical inter-organizational structure 500, in accordance with an embodiment of the present principles.

Referring to FIG. 5, an exemplary hierarchical inter-organizational structure 500 is shown in accordance with an embodiment of the present principles. A set of objects (e.g., resources), designated as unit 510, are included in a set of objects designated as Department A 520. Department A 520 and a set of objects, designated as Department B 530, are included in a set of objects designated as account A 540. Account A, in turn, is included in a set of objects designated as customer A 550. Hence, unit 510 is included in Department A 520, account A 540, and customer A 550.

Thus, in FIG. 5, the subjects are divided into groups according to their owners.

Thus, with respect to the object approximation 500, sets of objects (subjects) of authorization could be extended to the next level(s) of set that subsumes the current set. The access to resources of unit 310 could be "approximated" to resources of any of 3 levels.

It is to be appreciated that the hierarchical structures of subjects to which the present principles may be applied are not limited to that shown and described with respect to FIG. 5 and, thus other hierarchical structures may also be used in accordance with the teachings of the present principles, while maintaining the spirit of the present principles. Thus, in another example, a server has a number of applications. The computer system is owned by supporting organization A, the application server (middleware) is owned by the organization B and different applications running in that middleware are owned by different departments.

Figure 6:
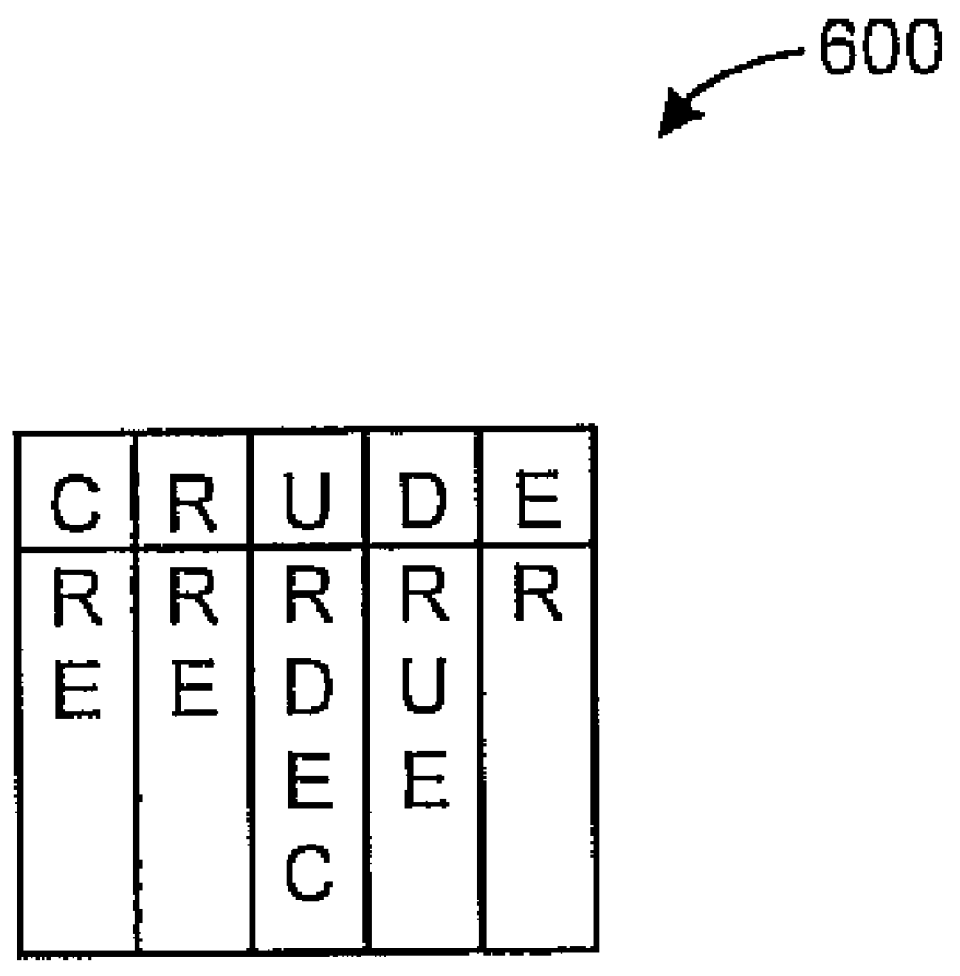

Referring to FIG. 6, exemplary permission approximation 600 is shown in accordance with an embodiment of the present principles. In FIG. 6, "C" denotes "create", "R" denotes "read", "U" denotes "update", "D" denotes "delete", and "E" denotes "edit".

The permission approximation 600 involves a matrix 410 as an example thereof. In the example, the "create" permission could be extended to include other permissions.

In accordance with one or more embodiments, descriptions will now be given relating to additional inputs and/or approximation parameters that may be included in an adaptive approximation of a user for role authorization in a hierarchical inter-organizational model (e.g., in a service provider environment).

Such additional inputs and/or approximation parameters may include and/or otherwise relate to, but are not limited to: when to use approximated authorization; role (access) information; inference depth information; SMA authorization depth information (hierarchical SMA); and one or more relationship policies.

With respect to role (access) information, in an embodiment, such role (access) information may include, for example, actions and permissions that all users in the group have to all organization's SMA associated with the group. Of course, the present principles are not limited to the preceding role (access) information and, thus, other role (access) information may also be used in accordance with the teachings of the present principles, while maintaining the spirit of the present principles.

With respect to inference depth, in accordance with an embodiment, inference depth may be represented as follows: a value of 0 indicates organizational level specified only; a value of 1 indicates the specified organizational structure and the next level; a value of N (where N is an integer) indicates the specified organizational structure and N levels below in the tree; and a value of −1 indicates indefinite depth, that is all levels in the Organizational hierarchy below the specified level. Of course, the present principles are not limited to the preceding values and indications with respect to inference depth and, thus, other values and/or indications may also be used in accordance with the teachings of the present principles, while maintaining the spirit of the present principles.

With respect to SMA authorization depth (hierarchical SMA), in accordance with an embodiment, SMA authorization depth may be represented as follows: a value of 0 indicates a high level only; a value of 1 indicates root elements of SMA trees; a value of N indicates N levels in the SMA tree; and a value of −1 indicates indefinite depth, that is all elements in the SMA. Of course, the present principles are not limited to the preceding values and indications with respect to SMA authorization depth and, thus, other values and/or indications may also be used in accordance with the teachings of the present principles, while maintaining the spirit of the present principles.

With respect to relationship policies, such policies may include, for example, authorization to related SMAs. Of course, the present principles are not limited to the preceding relationship policies and, thus, other relationship policies may also be used in accordance with the teachings of the present principles, while maintaining the spirit of the present principles.

In an embodiment, a standard authorization may involve the following: User 1 obj—Customer A; permission {Pi}; top level SMA; user 1 is part of Customer A and has set of permissions {pi} to top level objects which all users of Customer A have; +{Inference Object=1 and SMA=2 and p+=3. Hence, according to the preceding notation, in an embodiment, the adaptation policy allows this user (i.e., user 1) to access objects of Customer A and also the parent-Customer A, in addition to the authorization being extended to a second level of a corresponding hierarchical structure of subjects and allowing a third level of permissions starting from Pi.

In contrast, in an embodiment directed to the adaptation of the standard policy set forth above, the following policy may be used:

User 1obj Customer A+all Organizations; up to third level child (Software Install in Computer System).

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope and spirit of the invention as outlined by the appended claims. Having thus described aspects of the invention, with the details and particularity required by the patent laws, what is claimed and desired protected by Letters Patent is set forth in the appended claims.

What is claimed is:

1. A system, comprising:
an authorization redirector for receiving a request for an access control decision for a user, and for determining whether to use a predetermined authorization policy or a user role approximation of the predetermined authorization policy to process the request; and
an adaptive authorizer for dynamically determining, at runtime, a user role approximation for the user responsive to the request, the user role approximation based on at least one of a system state and a system goal corresponding to a hierarchical inter-organizational model.

2. The system of claim 1, wherein the system state includes load characteristics of the system.

3. The system of claim 1, wherein the user role approximation is further dynamically determined based on a policy that lessens restrictions imposed by the user role approximation.

4. The system of claim 1, wherein the user role approximation is further dynamically determined based on a type of service.

5. The system of claim 1, wherein the user role approximation is dynamically determined for use within a pre-specified time period based on at least one of identical or different considerations with respect to a basis of the user role approximation.

6. The system of claim 1, wherein access rights inferred for the user are approximated to access rights corresponding to a closest user group, when a particular one of the user groups to which the user belongs is embedded within another one of the user groups.

7. The system of claim 1, wherein the user role authorization is further based on a hierarchical structure of at least one of service consumers, user groups, and action to permission relationships.

8. The system of claim 7, wherein the user role approximation is further based on at least one of at an inference depth and a service management artifact authorization depth, the inference depth relating to at least one of a specified organizational level, a specified organizational structure, and one or more levels in the hierarchical inter-organizational model, the service management artifact authorization depth relating to at least one of one or more high levels, one or more intermediate levels, one or more low levels, one or more high level elements, one or more intermediate level elements, and one or more low level elements, with respect to a corresponding service management artifact tree.

9. The system of claim 1, wherein the user role approximation is rendered on a group-level.

10. In a computer processing system having at least an authorization redirector and an adaptive authorizer, a method, comprising:

receiving a request for an access control decision for a user, by the authorization redirector;

determining whether to use a predetermined authorization policy or a user role approximation of the predetermined authorization policy to process the request, by the authorization redirector; and dynamically determining, by the adaptive authorizer at run-time, a user role approximation for the user responsive to the request, the user role approximation based on at least one of a system state and a system goal corresponding to a hierarchical inter-organizational model.

11. The method of claim 10, wherein the system state includes system load characteristics.

12. The method of claim 10, wherein the user role approximation is further dynamically determined based on a policy that lessens restrictions imposed by the user role approximation.

13. The method of claim 10, wherein the user role approximation is further dynamically determined based on a type of service.

14. The method of claim 10, wherein the user role approximation is dynamically determined for use within a pre-specified time period based on at least one of identical or different considerations with respect to a basis of the user role approximation.

15. The method of claim 10, wherein access rights inferred for the user are approximated to access rights corresponding to a closest user group, when a particular one of the user groups to which the user belongs is embedded within another one of the user groups.

16. The method of claim 10, wherein the user role authorization is further based on a hierarchical structure of at least one of service consumers, user groups, and action to permission relationships.

17. The method of claim 16, wherein the user role approximation is further based on at least one of at an inference depth and a service management artifact authorization depth, the inference depth relating to at least one of a specified organizational level, a specified organizational structure, and one or more levels in the hierarchical inter-organizational model, the service management artifact authorization depth relating to at least one of one or more high levels, one or more intermediate levels, one or more low levels, one or more high level elements, one or more intermediate level elements, and one or more low level elements, with respect to a corresponding service management artifact tree.

18. The method of claim 10, wherein the user role approximation is rendered on a group-level.

* * * * *